United States Patent [19]

Hammarskjold et al.

[11] Patent Number: 5,217,181

[45] Date of Patent: Jun. 8, 1993

[54] SLIDING SUPPORT

[75] Inventors: Christian U. Hammarskjold; Ulf G. Hammarskjold, both of Malvern; Michael Miller, Boyertown, all of Pa.

[73] Assignee: USSC Group, Inc., West Conshohocken, Pa.

[21] Appl. No.: 843,831

[22] Filed: Feb. 28, 1992

[51] Int. Cl.⁵ .............................................. F16M 13/00
[52] U.S. Cl. .................................... 248/424; 248/285; 248/298; 297/345
[58] Field of Search ............... 248/430, 429, 285, 424, 248/425, 279, 298; 384/42; 296/65.1; 297/344, 345

[56]  References Cited

U.S. PATENT DOCUMENTS

| | | | |
|---|---|---|---|
| 1,167,932 | 1/1916 | Robertson | 297/344 |
| 1,315,086 | 9/1919 | Brunker | 248/285 X |
| 1,338,616 | 4/1920 | Ewing | 248/425 |
| 1,851,468 | 3/1932 | Townsend | 105/342 |
| 2,667,209 | 1/1954 | Gundersen | 297/344 |
| 3,182,605 | 5/1965 | Brasher | 105/342 |
| 4,026,379 | 5/1977 | Dunn et al. | 105/456 |
| 4,046,419 | 9/1977 | Schmitt | 297/344 |
| 4,134,565 | 1/1979 | Carter | 248/285 |
| 4,155,309 | 5/1979 | Ames et al. | 105/342 |
| 4,184,434 | 1/1980 | Chapin | 105/456 |
| 4,408,743 | 10/1983 | DeWitt | 297/345 |
| 4,555,138 | 11/1985 | Hughes | 297/344 |
| 4,738,081 | 4/1988 | Tisma | 384/42 X |
| 5,011,209 | 4/1991 | Takarabe | 296/65.1 |
| 5,118,062 | 6/1992 | Archambault | 248/298 |
| 5,118,204 | 6/1992 | Peters | 384/42 |

*Primary Examiner*—J. Franklin Foss
*Attorney, Agent, or Firm*—Volpe and Koenig

[57] ABSTRACT

A sliding support of the type which mounts to and traverses along a vertical support structure. The sliding support is comprised of a track, a sliding structure which is vertically supported and a non-lubricating bearing material. The track defines an interior channel which is co-extensive to the distance traversed by the sliding support and an aperture, opposite the support structure, and in communication with the internal channel. The sliding structure has a slide means located in the channel and overlying the aperture. A horizontal support means is secured to the slide means and extends through the aperture. A vertical support means is secured to the horizontal support means and maintains the horizontal support means in a horizontal plane. The non-lubricated bearing material is positioned in the channel between the channel and the slide means.

14 Claims, 3 Drawing Sheets

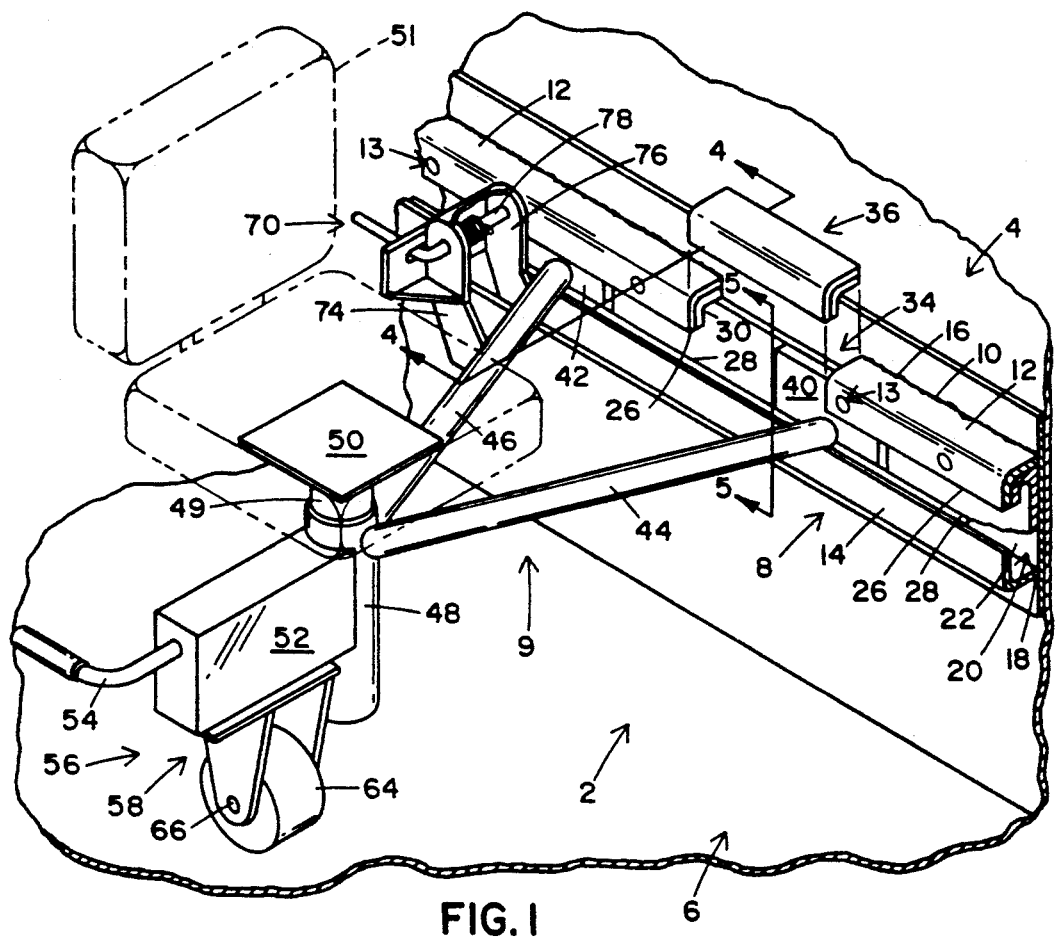
FIG. 1
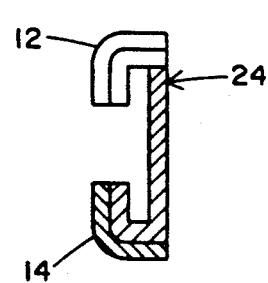
FIG. 5
FIG. 5A
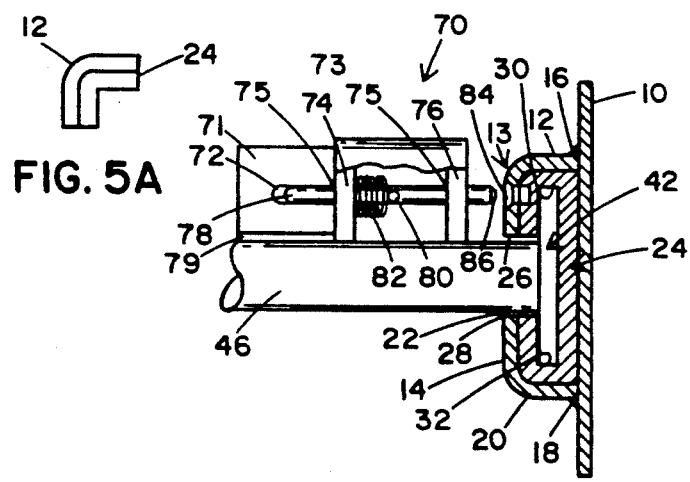
FIG. 4

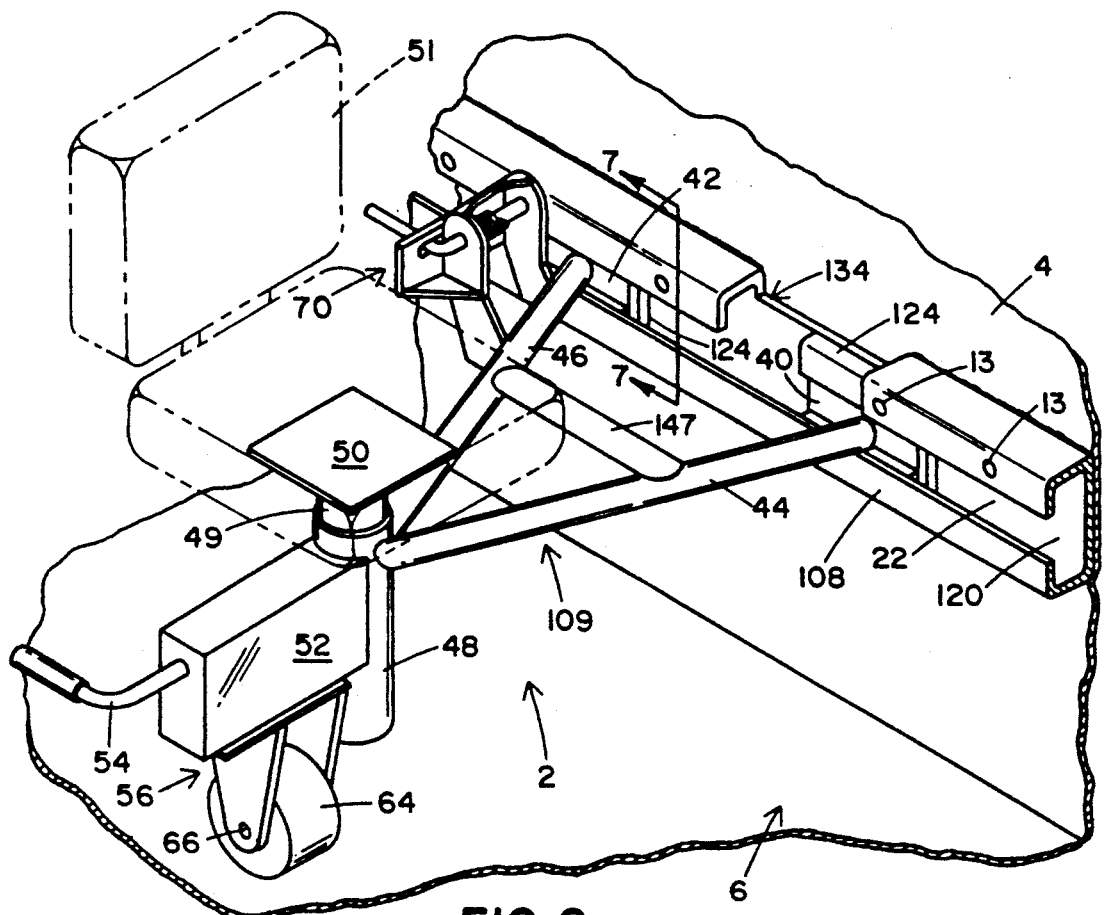
FIG. 6
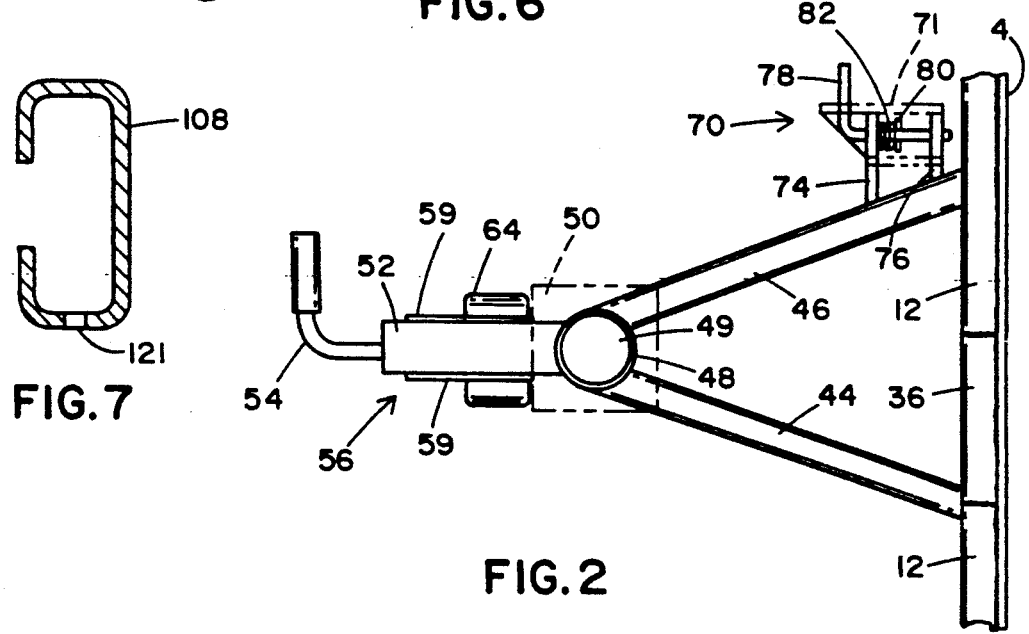
FIG. 7
FIG. 2

5,217,181

1

SLIDING SUPPORT

BACKGROUND OF THE INVENTION

1. Field of the Invention

This invention relates generally to slidable supports. More particularly, the present invention relates to a slidable support for use in a vehicle. Most particularly, the present invention relates to a slidable support for operator's seat in a locomotive.

2. Description of the Prior Art

It is well known in the art to provide a work station or operator's seat on a movable platform. It is known in the art to track mount a slide support on a wall or other vertical support structure. It is known in the art to use a horizontal structure which is cantilevered from the vertical support. It is known in the prior art to provide a cantilevered structure an additional support member which is pinned to the base of the vertical support structure to form a third point of contact when the support is set in position. In these three point prior art configurations, the third point of contact lies generally in the same plane as the contact points of the vertically mounted support structure and must be disengaged during movement of the support structure.

The prior art embodiments present two known disadvantages. First, the vertical support structure provides virtually all of the support for the sliding support, especially during movement of the sliding support. Unless the supporting structure is reinforced and the track is properly maintained, distortions in that structure occur. These distortions interfere with the operation of the slide. Since the additional support member must be held out of contact during movement of the sliding support, these distortions made movement of the sliding support more difficult. Second, the prior art mounting arrangement and the track for the sliding support are difficult and/or expensive to maintain and the lubricants present a potential injury hazard to the personnel. A number of injuries have been attributed to lifting and moving the prior art seats. This is particularly true with the new, heavier, comfort cab seats.

In view of the above, it is an object of the present invention to eliminate the prior art maintenance disadvantages and to provide a sliding support with improved load distribution during mvoement and when in use. In addition, it is an object of the invention to provide a sliding support which may be supplied as either original equipment or may be retrofitted without substantial modification of the existing vertical support structure.

SUMMARY OF THE INVENTION

A sliding support of the type which mounts to and traverses along a vertical support structure. The sliding support is comprised of a track, a sliding structure which is vertically supported and a non-lubricating bearing material.

The track has an internal channel with a minimum length which is at least equal to the distance traversed by the sliding support and an aperture that communicates with the internal channel.

The sliding structure is comprised of a slide means located in the channel and overlying the aperture. A horizontal support means is secured to the slide means and extends through and away from the aperture. A vertical support means is secured to the horizontal support and maintains the horizontal support means in a horizontal plane.

The non-lubricated bearing material is positioned between the channel and the slide means.

BRIEF DESCRIPTION OF THE DRAWINGS

FIG. 1 illustrates, in perspective, one embodiment of the sliding support in accordance with the invention with a seat shown in phantom.

FIG. 2 is a top plan view of the embodiment of FIG. 1 showing that slide support in its fully assembled condition.

FIG. 4 is a section through the line 4—4 of FIG. 1.

FIG. 5 is a section through the line 5—5 of FIG. 1.

FIG. 5a is a side view of the access cover shown in FIG. 1.

FIG. 6 is a perspective view of a second embodiment of a sliding support in accordance with the present invention.

FIG. 7 is a section through the line 7—7 of FIG. 6.

DESCRIPTION OF THE PREFERRED EMBODIMENTS

Figure 3:
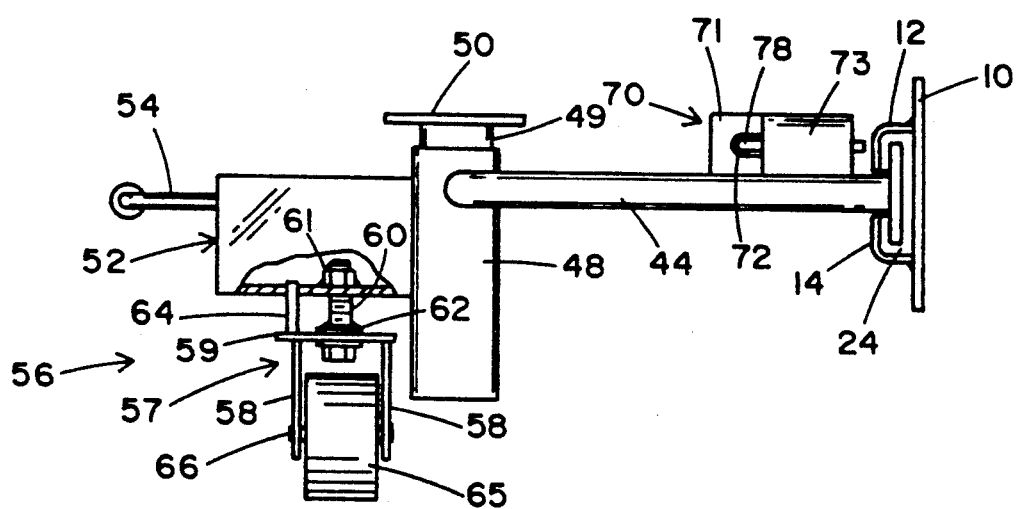
FIG. 3 is a side elevation of the slide support of FIG. 1 without the seat.

The preferred embodiments will be described with reference to the drawing figures wherein common elements are identified in all figures by the same numeral.

With reference to FIG. 1, there is shown the sliding support 2 which includes the track assembly 8 and the sliding structure 9. The sliding structure 9 is supported in the horizontal plane by the track assembly 8 which is secured to the vertical support structure 4 in a known manner. The sliding structure 9 is retained in a horizontal plane by the sliding pods 40 and 42 and is supported in a vertical plane by wheel 64 which rests upon the floor or base 6.

Still with reference to FIG. 1, track assembly 8 is generally comprised of a structural element and a bearing element. In this embodiment a backing plate 10 is secured to the vertical support 4. The upper and lower channel halves 12 and 14 are secured to the backing plate 10 via the respective weld beads 16 and 18. As can be seen from FIG. 1, the upper and lower channel halves, 12 and 14, are secured to the plate 10 in a spaced relationship. This forms the generally "C" shaped channel 20 which is positioned in reverse orientation and has the aperture or opening 22 facing away from the backing plate 10. The horizontal length or width of track assembly 8 is determined by the distance which will be traversed by the sliding structure 9. It will be obvious to those skilled in the art that the track assembly 8 should be of sufficient length or size to retain control over the movement of the pods 40 and 42 throughout the distance of travel.

Track assembly 8 will be discussed in more detail with reference to FIGS. 1 and 4. A non-lubricating bearing material 24 is positioned within channel 20. Like the track, the bearing material 24 has a generally "C" shape and the opening faces away from the backing plate 10. As can be seen from FIG. 4, the upper and lower track halves 12 and 14 and the bearing material 24 terminate in the common places 26 and 28 which define the aperture or opening 22. The bearing material 24 is a generally uniform thickness and defines a sub-channel having upper slot 30 and lower slot 32. The sub-channel is dimensioned to compliment the pods 40 and 42. As noted previously, bearing 24, which defines the slots 30 and 32, and the track terminate in the common planes 26 and 28 which are spaced on either side of the opening 22. This permits free movement of the horizontal supports 44 and 46 as the sliding support 9 traverses along the vertical support structure 4. As can be seen from FIG. 4, the pods 40 and 42 are captured within the slots 30 and 32 of bearing material 24. Opening 22 is dimensioned to just accommodate the horizontal support arms 44 and 46 which are secured to the respective pod since this provides the maximum bearing support. However, it will be understood that the only sizing requirement is that the pods 40 and 42 be confined in the channel by the aperture 22. In the preferred embodiments bearing material 24 is cast nylon which is available as Nylatron T-Slot slide track from Plastic Products, Inc. of Bessmer City, N.C. 28016.

As can be seen from FIG. 1, the sliding structure 9 is supported in the horizontal plane by the support arms 44 and 46 which generally form an isosceles triangle. The horizontal support arms 44 and 46 terminate at the vertical tube 48. In the preferred embodiment, an adjustable spring 49 is located in the vertical tube 48 and includes the platform 50. For the purpose of illustration, a seat 51 is shown in phantom on platform 50. A lever 54 is provided for adjustment of the platform 50. The lever 54 extends through the housing 52 which is secured to the vertical tube 48. Attached to the housing 52 is a wheel assembly 56. The vertical position of the sliding support is maintained through the contact of the wheel 64 with the floor or support base 6. Wheel assembly 56 will be described in more detail hereinafter with respect to FIG. 3. The tube 48, cylinder 49 and adjustment lever 54 form an adjustable platform which is of known construction. Suitable components for such an assembly are available from Cam Industries of Warminster, Pa. 18974. The wheel assembly 56 includes a heavy duty caster of the type available from most industrial hardware or mill supply houses.

Referring now to FIGS. 1 and 3, wheel assembly 56 will be described in more detail. The wheel assembly 56 has a frame 57 which is comprised of the sides 58 that depend from the base 59. The sides 58 are spaced by a sufficient distance to permit free movement of the wheel 64 and include coaxial apertures which receive the axle shaft 66 of wheel 64. The base 59 includes an aperture through which the threaded adjusting bolt 60 passes. The adjusting bolt 60 passes into the housing 52 and it is secured by a threaded member, such as a nut, 61. The locking collar 62, here a spot welded washer, retains the bolt 60 in a fixed position with respect to the base 59 but permits free rotation of the bolt 60 therein. By rotating the bolt 60 into and out of the threaded member 61 the gap between housing 52 and assembly 56 can be adjusted. The stabilizer 64 is a generally circular shaft which is received within housing 52 through the aperture 63 and serves to stabilize the wheel assembly 56. While it is expected that the track assembly 8 will be initially mounted on the vertical support surface at a distance from the floor which is consistent with the vertical dimensions of the sliding support 9, the bolt 60 permits a final adjustment to maintain support arms 44 and 46 in a horizontal plane for free movement along the support structure 4.

It will be understood by those skilled in the art that the present invention will perform most efficiently in an installation where the track assembly 8 has been positioned a proper distance from the floor or base and the track assembly 8 is located in a true vertical position with respect to the floor or base. In the preferred embodiment, the backing plate 10 is preferably a metal plate of sufficient gauge to independently support the anticipated load placed on the sliding structure 9. As a result, the mounting of the backing plate 10 to the support 4 may include the use of shims or other spacing devices which will accommodate irregularities in the support surface. This is of particular advantage in retrofitted applications where the support structure 4 may not be plumb or true.

The preferred embodiments include a position lock 70 which will be discussed in detail with reference to FIGS. 1 and 4. As shown in FIGS. 1 and 4, the upper track half 12 is provided with a series of bores 13 that are spaced along its length. The locking mechanism 70 is positioned on the horizontal support arm 46 so that the bolt 78 will engage a respective bore 13. Locking mechanism 70 is constructed in a fairly simple manner and is intended to be continuously biased toward the locking position unless it is restrained by the operator. The locking mechanism is mounted on arm 46 by the two vertical mounts 74 and 76. The fixed ends of vertical mounts 74 and 76 have radii and are mounted directly on the arm 46. The vertical mounts 74 and 76 are differentially sized so as to compensate for the angle of arm 46 and to bring the apertures 75 in line with the bores 13. The locking mechanism is provided with a cover having one side portion 71 that includes the slot 72 and an arcuate portion 73 which is dimensioned to encase the space between the vertical mounts 74 and 76. The base plate 79 extends between side 71 and the vertical mount 74 and provides rigidity during movement of the bolt 78. With reference to FIG. 4, it can be seen that the bolt 78 is positioned within the apertures 75 and has a tapered portion 86 which complements the recess 84 and assists in engagement of the bolt 78 in the bore 13. In order to continuously bias the bolt 78 into the locing position, bolt 78 is provided with a pin 80 and a spring 82. When bolt 78 is retracted, pin 80 compresses the spring 82 against vertical mount 74. When an operator releases the bolt 78, the spring 82 will bias it against the track and it will engage the next bore 13.

As will be appreciated by those skilled in the art, the sliding member 9 may be located within the track assembly 8 by addressing the track assembly from either end. However, in may applications side access is unavailable. Accordingly, the access opening 34 is provided. Access opening 34, in the preferred embodiment, is of a sufficient size to permit each of the pods to be inserted individually. In general, there is enough flexibility to permit movement along the channel so that the next pod may be inserted into the access opening. After the pods have been inserted, the access cover 36 is welded in the access opening 34. This condition is illustrated in FIG. 2. As can be seen from FIGS. 5 and 5a, the channel 12 and the bearing material 24 will complement each other when the cover 36 is positioned in access opening 34 and the bearing material is uninterrupted.

A second embodiment of the invention will be described with reference to FIGS. 6 and 7 wherein like elements are identified with the same numerals. With reference to FIG. 6, it can be seen that the track 108 is a one piece construction that is generally rectangular and defines the aperture 22 and the interior channel 120. An access opening 134 is procided in the track 108. The track 108 is secured to the support structure 4 by welding as with the prior embodiment. Unlike the prior embodiment, the bearing material of this embodiment is not continuous throughout the interior channel 120 of track 108. Instead, the pods 40 and 42 are provided with the non-lubricated bearing material 124 which is secured thereto and travels with the pod. Bearing material 124 is the same as bearing material 24 and has been cut to size. Like the prior embodiment, an access sopening 134 is provided. The sliding support 109 is substantially similar to the construction of sliding support 9; however, the cross member 147 is provided between the horizontal support arms 44 and 46 to produce an "A" frame construction. With this embodiment, it is believed that the additional support provided by the cross member 147 will serve to balance the load between the pods 40 and 42. With reference to FIG. 7, there is shown a section of the track 108 which illustrates the inclusion of a drain hole 121. At present, it is preferred to position a plurality of drain holes within the track 108 to assist in cleaning of the track and to avoid abrasion due to foreign materials. It will be appreciated by those skilled in the art that the interior of track 108, at the location of drain hole 121, should be deburred. At present, it is anticipated that both embodiments will utilize drain holes as a means of controlling foreign materials. In the embodiment of FIG. 1, the drain hole extends through the bearing material 24. In normal use, the movement of the pods 40 and 42 will sweep or push material towards the drain holes 121. If desired, the drain holes may be flushed with water or blown clean with compressed air.

In the preferred embodiment, the arms 44 and 46 and the cross member 147 are steel tubing having approximately a 3 inch diameter. The tube 48 is also a steel tube which is sized to fit the cylinder 49. All of the other parts are also of industrial weight. With respect to dimensions, the distance from the center of the tube 48 to the plane defined by the pods 40 and 42 is approximately 14 inches. The distance between the centers point of the arms 44 and 46 where they are connected to the pods is approximately 12 inches. The top of tube 48 is between 10 and 11 inches from the floor or base 2. As noted previously, the adjustment is accomplished through the threaded bolt 60.

In use, the sliding support structure, 9 or 109, may be moved along the track, 8 or 108, by simply pushing the sliding support structure in the desired direction. The operator is not required to lift the or to provide any additional support to the sliding structure during movement.

With respect to load distribution, it will be appreciated that the location of wheel assembly 56 away from the support structure 4 will locate the weight distribution on the pods 40 and 42 and the wheel assembly 56. Thus, the vertical support structure 4 is not solely responsible for supporting or retaining the sliding support structure in its proper position. As noted previously, this is of particular importance in retrofit applications where the wall and floor may no longer be plumb, level or square with respect to each other.

As can be appreciated by those skilled in the art, the present invention is especially useful for heavy equipment and uses.

We claim:

1. An improved sliding support of the type which mounts to a fixed support structure, the improved sliding support being comprised of:
   a track having an internal channel and an aperture which opens away from the support structure and communicates with the channel;
   slide means located in the internal channel and overlying the aperture;
   non-lubricating bearing material positioned between the slide means and channel;
   horizontal support means perpendicularly secured to the slide means and extending through the aperture and away from the track; and
   vertical support means secured to the horizontal support means which provides a separate load path, away from the fixed, vertical support structure, for maintaining the vertical position of the sliding support.

2. The improved sliding support of claim 1 wherein non-lubricating bearing material supports the slide means in the internal channel.

3. The improved sliding support of claim 1 wherein the non-lubricating bearing material is affixed to the track inside the internal channel.

4. The improved sliding support of claim 3 wherein the track is generally "C" shaped and the non-lubricating bearing means forms a sub-channel in the track, the slide means are positioned in the sub-channel.

5. The improved sliding support of claim 1 further comprising a vertically adjustable platform attached to the horizontal support means.

6. The improved sliding support of claim 5 further comprising a seat attached to the platform.

7. The improved sliding support of claim 1 wherein the non-lubricating bearing material is attached to the slide means.

8. The improved sliding support of claim 1 wherein the slide means are comprised of two pods which complement the channel and are confined in the channel by the aperture.

9. The improved sliding support of claim 1 further comprising a locking means for locking the sliding support at a fixed position along the track.

10. An improved sliding support of the type which mounts to and traverses along a vertical support structure, the improved sliding support being comprised of:
    a track having a minimum length which is at least equal to the distance traversed by the sliding support, an aperture on one surface of the track which extends for the minimum length and opens away from the support structure and an internal channel that extends for at least the minimum length and communicates with the aperture;
    non-lubricated bearing material which is received within the channel and includes a sub-channel which is perpendicular to a horizontal plane through the aperture;
    slide means located in the sub-channel and overlying the aperture;
    horizontal support means perpendicularly secured to the slide means and extending through the aperture and away from the track; and
    vertical support means which is secured to the horizontal support and maintains the horizontal support means in a horizontal plane.

11. The improved sliding support of claim 10 wherein the vertical support means provides a separate load path, away from the vertical support structure, for maintaining the horizontal support means in a horizontal plane.

12. The improved sliding support of claim 10 wherein the slide means are comprised of two pods which complement the sub-channel and are confined in the channel by the aperture.

13. An improved sliding support of the type which mounts to and traverses along a veertical support structure, the improved sliding support being comprised of:
- a track having a minimum length which is at least equal to the distance traversed by the sliding support, an aperture on one surface of the track which extends for the minimum length and opens away from the support structure and an internal channel that extends for at least the minimum length and communicates with the aperture;
- non-lubricated bearing material received within the channel and including a sub-channel which communicates with the aperture;
- slide meands supported in the channel by the non-lubricated bearing material and overlying the aperture;
- horizontal support means perpendicularly secured to the slide means and extending through the aperture and away from the track; and
- vertical support means which is secured to the horizontal support and maintains the horizontal support means in a horizontal plane.

14. The improved sliding support of claim 13 wherein the vertical support means is further comprised of a caster mounted for movement on a generally horizontal surface below the horizontal support means, and provides a separate load path, away from the vertical support structure, for maintaining the horizontal support means in a horizontal plane.

* * * * *

UNITED STATES PATENT AND TRADEMARK OFFICE
CERTIFICATE OF CORRECTION

PATENT NO.   : 5,217,181
DATED        : June 8, 1993
INVENTOR(S)  : Hammarskjold, et. al.

It is certified that error appears in the above-indentified patent and that said Letters Patent is hereby corrected as shown below:

At column 1, line 47, delete "mvoement" and insert therefor -- movement --.

At column 4, line 37, delete "locing" and insert therefor -- locking --.

At column 4, line 46, delete "may" and insert therefor -- many --.

At column 4, line 66, delete "procided" and insert therefor -- provided --.

At column 5, line 7, delete "sopening" and insert therefor -- opening --.

At column 5, line 61, before the word "uses" insert -- industrial --.

UNITED STATES PATENT AND TRADEMARK OFFICE
CERTIFICATE OF CORRECTION

PATENT NO. : 5,217,181
DATED : June 8, 1993
INVENTOR(S) : Hammarskjold, et. al.

It is certified that error appears in the above-indentified patent and that said Letters Patent is hereby corrected as shown below:

In claim 13, column 7, at line 2, delete "veertical" and insert therefor -- vertical --.

Signed and Sealed this

First Day of February, 1994

Attest:

BRUCE LEHMAN

*Attesting Officer*         *Commissioner of Patents and Trademarks*